May 28, 1935.  W. J. GROTENHUIS  2,002,736
WINDSHIELD
Original Filed Aug. 4, 1930
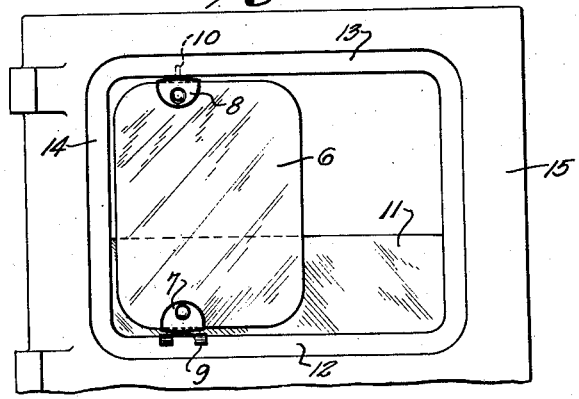
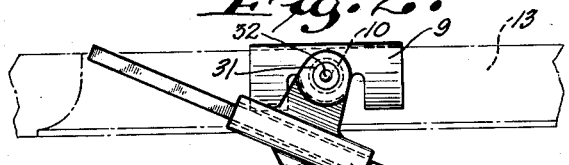
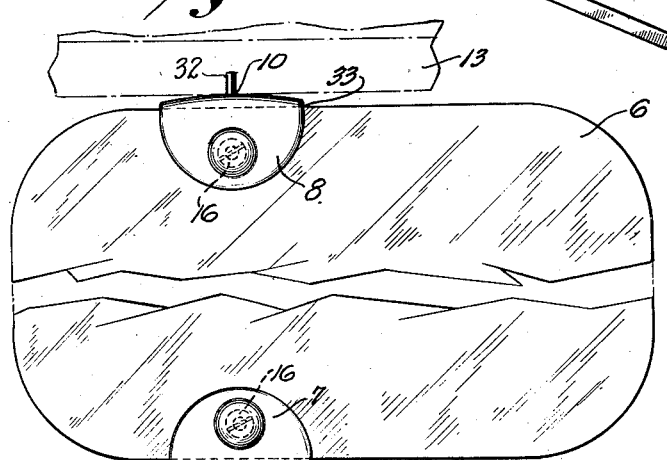
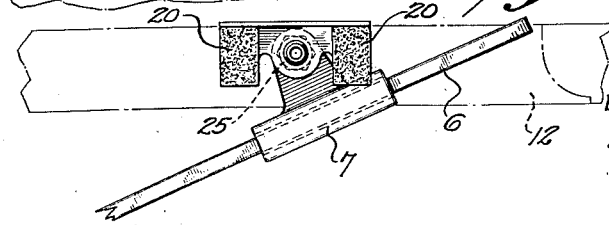
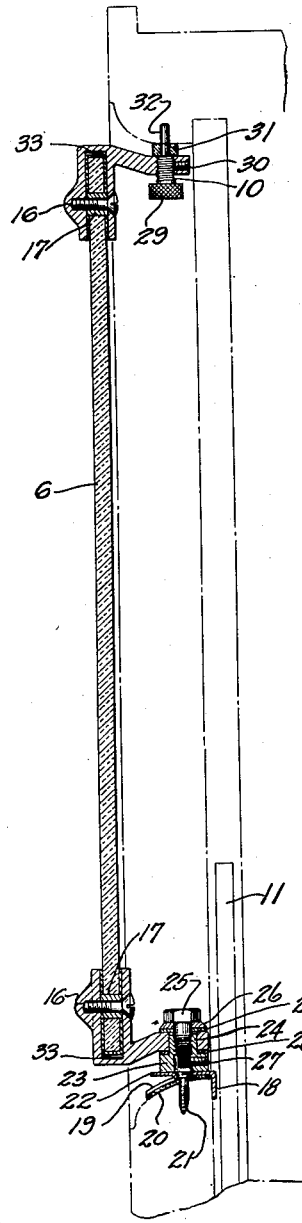
INVENTOR.
W. J. Grotenhuis
BY Morsell & Morsell
ATTORNEY.

Patented May 28, 1935

2,002,736

UNITED STATES PATENT OFFICE 2,002,736

WINDSHIELD

William J. Grotenhuis, Chicago, Ill., assignor to The Fulton Company, West Allis, Wis., a corporation of Wisconsin Application August 4, 1930, Serial No. 473,046
Renewed April 9, 1934

14 Claims. (Cl. 296—84)

The present invention relates in general to improvements in so-called wind shields, and relates more specifically to improvements in the construction and operation of adjustable ventilators and air deflectors for shielding the occupants of a moving vehicle against draft and objects floating in the air, while permitting suitable ventilation of the interior of the vehicle.

Generally stated, an object of the invention is to provide an improved wind shield structure which is simple and compact in construction, efficient in operation, and which may be readily applied to or removed from the window of any standard vehicle.

It has heretofore been proposed in the automotive industry to provide pivotally adjustable auxiliary deflector shields at the opposite ends of the main windshield of an automobile for the purpose of effecting ventilation of the vehicle while in motion, and to protect the occupants against undesirable draft and objects floating in the outside air. These prior auxiliary wind shields usually comprise a transparent shield pivotally supported upon upper and lower brackets secured either to the upper and lower window frames or reveals of the side windows in the case of closed cars, or to the main wind shield supporting brackets in the case of open cars. While the supporting brackets of some of the prior structures are rigidly attachable by screws or bolts, to the outer side surfaces of window frames, such mode of attachment is objectionable because it necessitates undesirable marring of the car finish. Other types of these prior structures utilize supporting brackets which frictionally engage the reveal surfaces of the windows, and these are objectionable because the vibration tends to loosen the supporting brackets, and also because a large number of differently formed supporting brackets are necessary in order to fit the numerous shapes of reveals employed by the car manufacturers. It is furthermore objectionable in any structure of this general type, to utilize supporting elements which obstruct the view of the occupants of the vehicle, and to subject the deflector shield, which is ordinarily formed of brittle material such as glass, to stresses which will tend to cause breakage thereof.

More specifically stated it is an object of the present invention to provide an improved adjustable deflector or wind shield especially adapted for the general class of service hereinabove referred to, which eliminates the objectionable features of the prior art devices. The invention contemplates provision of an improved supporting structure for an auxiliary windshield, which is conveniently applicable to windows having reveals of various shapes, which may be readily adjusted and locked in adjusted position and wherein the shield is subjected to minimum stress while avoiding obstruction to the vision of the occupants of a vehicle to which the device is applied. The improved structure is moreover applicable without noticeably marring the vehicle finish, presents a neat appearance when applied, permits relatively unobstructed manipulation of and access to the main sliding window for cleaning purposes, and may be manufactured and sold at minimum cost. These and other objects and advantages will appear from the following detailed description.

A clear conception of an embodiment of the several features constituting the present improvements and of the mode of constructing, applying and of manipulating wind shields constructed in accordance therewith, may be had by referring to the drawing accompanying and forming a part of this specification in which like reference characters designate the same or similar parts in the several views:

Fig. 1 is a side elevation of a fragment of one of the front side doors of an automobile, showing one of the improved auxiliary wind shields applied to the window thereof;

Fig. 2 is an enlarged top view of the improved wind shield, showing the same tilted toward the front window reveal to the maximum extent, without interfering with vertical sliding of the main window;

Fig. 3 is a similarly enlarged fragmentary side view of the deflector or wind shield, showing the same disposed parallel to the plane of movement of the main window;

Fig. 4 is a fragmentary similarly enlarged bottom view of the wind shield, showing the same tilted as in Fig. 2; and Fig. 5 is a similarly enlarged central vertical section through the improved wind shield and the supporting structure therefor.

Referring specifically to the drawing, the improved wind shield illustrated therein comprises in general a transparent substantially rectangular deflector shield 6 preferably formed of plate glass and having lower and upper supporting members 7, 8 rigidly attached to the opposite edge portions thereof, a distortable bracket 9 pivotally associated with the lower supporting member 7, and a pivot element 10 carried by the upper member 8 and coactable directly with an adjacent window reveal. The device illustrated is especially applicable to the forward side doors 15 of an automobile, these doors ordinarily being provided with vertically adjustable windows 11 having lower and upper laterally curved reveals 12, 13, respectively, and similarly curved front reveals 14. The forward side doors 15 are ordinarily supported upon hinges at the front thereof as illustrated in Fig. 1.

The supporting members 7, 8 may be of similar construction, each of these members comprising a pair of flanges coacting with opposite sides of the deflector shield 6, and an extension projecting laterally of the flanges and away from the shield 6. The shield 6 is provided with a hole of relatively large diameter disposed between the flanges of each of the supporting members 7, 8 and within each of these holes is located a flexible bushing 17 formed of wood, rubber, or the like. A clamping screw 16 is adapted to interconnect the flanges of each member 7, 8 in the manner indicated in Fig. 5, the clamping screw preferably being of slightly larger diameter than the opening through the bushing 17, in order to insure intimate internal coaction of the bushing with the adjacent opening through the shield 6, without undesirably stressing the shield. In some cases it may be desirable to drive a small resilient wedge into the spaces 33 at the opposite ends of each supporting member 7, 8 in order to properly aline the pivotal axes of these members. Suitable cement or other material may also be applied between the shield 6 and the flanges of the supporting members 7, 8 in order to avoid any possible looseness or play.

The distortable bracket 9 is preferably formed of readily bendable sheet metal and has an abutment flange 18 which is adapted to hook over the inside edge of the lower reveal 12 of the main window. The end portions 19 of the bracket 9 may be readily bent to conform exactly with the contour of a reveal 12 having any curvature, and felt pads 20 are preferably secured to the under sides of these distortable end portions 19, in order to avoid rattling and possible marring of the reveal. The medial portion 22 of the bracket 9 is of plane formation, and a pivot block 23 having a hollow pivot 24 formed integral therewith may be rigidly attached to the plane portion 22 of the bracket 9 in any suitable manner, as by welding or otherwise. The bracket 9 is adapted to be rigidly attached to the adjacent reveal 12 by means of a screw 21 which is accessible through the hollow pivot block 23. The pivot 24 of the pivot block 23 is adapted to coact with a vertical bore formed in the lateral extension of the lower supporting member 7, but the pivot 24 does not extend entirely through this extension. A clamping cap screw 25 has a threaded shank coacting with screw threads formed within the pivot 24, the head of this cap screw coacting with a metal washer 26 in order to clamp the lower supporting member 7 in any desired position of adjustment. Fibre washers 28 may be inserted between the washer 26 and the extension of the member 7 and between this extension and the pivot block 23, as shown, in order to enhance the clamping effect. The lowermost portion of the cap screw 25 may be provided with a circumferential series of notches, and a cone pointed set screw 27 which has screw thread coaction with the pivot block 23 may be brought into engagement with the successive notches of this series to positively lock the cap screw 25 in any desired position of adjustment.

The upper supporting member 8 is preferably located in direct vertical alinement with the lower member 7, and the pivot element 10 has screw thread coaction with an opening in the lateral extension of the bracket 8, which opening is vertically alined with the bore in the extension of the lower member 7. The pivot element 10 has a knurled manipulating head 29 at its lower end, and is provided at its upper end with an integral solid pivot 32 cooperable directly with a pivot hole formed in the upper reveal 13. This pivot hole is in direct vertical alinement with the axis of the clamping screw 25 and of the pivot 24 associated with the lower member 7, and may be formed by drilling or otherwise. Embracing the solid pivot 32 is a resilient washer 31 which may be compressed between the threaded enlarged portion of the element 10 and the upper reveal 13 so as to avoid possible looseness and consequent rattling of the coacting parts. The pivot element 10 may be locked in any desired position of adjustment by means of a cup pointed set screw 30.

When it is desired to apply the improved wind shield to a window, the lower and upper reveals 12, 13 should first be provided with the vertically alined holes for the reception of the screw 21 and of the pivot 32 respectively. These relatively small holes may be drilled or punched through the metallic covering of the reveals without noticeably marring the appearance of the window. The distortable end portions 19 of the bracket 9 may then be bent to conform perfectly with the lower reveal surface, after which the bracket 9 and its pivot block 23 may be firmly attached to the reveal 12 as shown in Fig. 1, with the flange 18 hooked over the inside edge of the reveal. After the bracket 9 has been thus secured in place, the lateral extension of the lower supporting member 7 may be slipped over the upper end of the hollow pivot 24 while the upper pivot element 10 is in its utmost retracted position, whereupon the element 10 may be screwed upwardly to cause the solid pivot 32 thereof to enter the pivot hole of the upper reveal 13. When the pivot element 10 has been positioned to properly compress the bushing 31, the locking set screw 30 may be manipulated to prevent release of the element 10. After the upper pivot has been thus finally positioned, the washer 26 and cap screw 25 may be applied, the fibre washers 28 having been previously inserted, and the cap screw 25 may be adjusted to clamp the shield 6 in any desired position of adjustment. The set screw 27 may then be manipulated to lock the cap screw 25 in place, thereby completing the attachment of the device. The mode of removing the wind shield will be readily apparent from the preceding description of the method of assembling the same, and these operations can obviously be effected by a novice without the use of special tools.

From the foregoing description, it will be apparent that the improved wind shield structure may be readily applied to windows having reveals of various shapes, to produce a simple, compact, rigid and readily manipulable assemblage. The device not only presents a neat appearance when applied, but avoids undesirable mutilation of the car finish. The flexible bushings 17 not only protect the glass shield 6 from undesirable stress, but eliminates looseness of parts. The rubber washer 31 surrounding the upper pivot 32 likewise eliminates looseness and possible rattling, being assisted in this function by the deflectable portions 19 and the felt pads 20 of the lower bracket 9. The supporting elements 7, 8 may be formed similar in shape, thereby facilitating manufacture of these parts, and the deflector shield 6 is obviously free from vision obstructing elements such as pivot rods spanning the gap between the upper and lower reveals. The provision of lateral extensions on the members 7, 8, which place the shield 6 remote from the axis of pivoting, moreover permits free access to the main window 11 for cleaning and adjustment, and the shield 6 may also be swung through a considerable angle thereby securing any desired ventilating effect. By swinging the shield 6 into the position shown in Fig. 2, maximum shielding of the car occupants is insured, whereas adjustment of the shield 6 to the reverse angle provides for scooping air into the car enclosure. The locking set screws 27, 30 are manipulable from the interior of the car with the aid of an ordinary screw driver, and serve to effectively maintain the shield 6 in adjusted position. The lower bracket 9 with its two point contact, also cooperates with the single upper pivot 32 to provide a rigid three point support for the shield, without stressing the relatively brittle glass shield 6.

It should be understood that it is not desired to limit the invention to the exact details of construction herein shown and described, for various modifications within the scope of the appended claims may occur to persons skilled in the art.

It is claimed and desired to secure by Letters Patent:

1. In combination, a deflector shield, supporting members secured to opposite edges of said shield, a bracket having its medial portion pivotally associated with one of said members and having portions on opposite sides of said medial portion of greater flexibility than said medial portion and readily distortable to fit various forms of reveals, and an adjustable pivot associated with the opposite side of said shield adapted to pivot within a hole formed directly in an adjacent reveal.

2. In combination, a deflector shield, a supporting member secured to an edge portion of said shield and having a bored integral extension projecting laterally therefrom, a bracket having an integral pivot fitting said bore, said bracket being disposed on one side of said extension, a cap screw coacting with the opposite side of said extension and adjustably engaging said pivot, and means for locking said cap screw to said pivot.

3. In combination, a deflector shield, a supporting member attached to said shield and having an extension provided with a bore, a bracket having a pivot coacting with said bore, said bracket being disposed on one side of said extension, a cap screw coacting with the opposite side of said extension and adjustable within said pivot, and a set screw for locking said cap screw in various positions of adjustment.

4. In combination, a deflector shield, a supporting member attached to said shield and having a bored extension, a distortable supporting bracket having a rigid hollow pivot coacting with the bore of said extension, a cap screw coacting with said extension and having screw thread coaction with the interior of said pivot, the end of said cap screw within said pivot being provided with circumferentially spaced notches, and a set screw cooperable with said notches to lock said cap screw in various positions of adjustment.

5. In combination, a deflector shield, supporting members rigidly attached to opposite edge portions of said shield, lateral extension members equipped with vertically aligned holes integral with said supporting members, a pivot element adjustable in one of said holes extending away from said deflector shield, a bracket having distortable end portions, a hollow pivotal element rigidly secured to the mid-portion of said bracket for engaging in the other of said holes, a cap screw in threaded coaction with the hollow pivotal element and bearing at the head end on said extension member to clamp the deflector shield in adjusted position.

6. In combination, a deflector shield, U-shaped supporting members rigidly attached to said shield at opposite edges thereof, lateral extension members integral with said supporting members, vertically aligned bores in said extension members, a bracket having distortable end portions, a bored pivotal element affixed to said bracket rotatably mounted in the bore of one of said extension members, clamping means in threaded relation with said hollow pivot for setting said deflector shield in adjusted position, and means for locking said clamping means.

7. In combination with the window reveals of a mobile vehicle, a deflector shield, supporting members attached to opposite edge portions of said shield, a laterally extending arm integral with each of said supporting members, vertically aligned holes in said arms, a pivot element extending from one of said holes and vertically adjustable therein for engaging directly in an adjacent window reveal, a bracket equipped with a pivot element for engaging in the other of said holes, and single means for rigidly attaching the bracket to an adjacent window reveal without marring the finish of the reveal.

8. In combination, a deflector shield, a supporting member secured to an edge portion of said shield and having a bored integral extension projecting laterally therefrom, a bracket having an integral pivot fitting said bore, said bracket being disposed on one side of said extension, movable means coacting with the opposite side of said extension and adjustably engaging said pivot, and means for locking said movable means to said pivot.

9. In combination, a deflector shield, a supporting member attached to said shield and having a bored extension, a distortable supporting bracket having a rigid hollow pivot coacting with the bore of said extension, adjustable means coacting with said extension and having screw thread coaction with the interior of said pivot, the end of said adjustable means within said pivot being provided with circumferentially spaced notches, and screw means cooperable with said notches to lock said adjustable means in various positions of adjustment.

10. In combination, a deflector shield, supporting members rigidly attached to opposite edge portions of said shield, lateral extension members equipped with upper and lower aligned holes and formed integral with said supporting members, a pivot element adjustable in one of said holes extending away from said deflector shield, a hollow pivotal element rigidly secured to the mid-portion of said bracket for engaging in the other of said holes, and adjustable means in threaded coaction with the hollow pivotal element and bearing at the head end on said extension member to clamp the deflector shield in adjusted position.

11. In combination, a deflector shield, U-shaped supporting members rigidly attached to said shield at opposite edges thereof, lateral extension members integral with said supporting members, upper and lower aligned bores in said extension members, a bored pivotal element affixed to said bracket rotatably mounted in the bore of one of said extension members, clamping means in threaded relation with said hollow pivot for setting said deflector shield in adjusted position, and means for locking said clamping means.

12. In combination with the window reveals of a mobile vehicle, a deflector shield, supporting members attached to opposite edge portions of said shield, a laterally extending arm integral with each of said supporting members, upper and lower aligned holes in said arms, a pivot element extending from one of said holes and vertically adjustable therein for engaging directly in an adjacent window reveal, a bracket equipped with an independent pivot element for engaging in the other of said holes, and means for rigidly attaching the bracket to an adjacent window reveal without marring the finish of the reveal.

13. In combination with the window reveal of a mobile vehicle, a glass shield, a metallic supporting member attached to each of the opposite edge portions of said shield, said shield alone constituting the only direct connection between said members and each of said members having a pivot opening therein, a pivot element adjustable within each of said member openings, a U-shaped bracket providing a support for one of said pivot elements and coacting with both the inside and outside surfaces of the adjacent portion of the window reveal, means for pivotally connecting the other of said pivot elements to another portion of the window reveal at the opposite side of said shield, and means for independently locking said pivot elements in axially adjusted position.

14. In combination, a deflector shield, supporting members secured to opposite edge portions of said shield, a bracket having a pivot coacting with a bore in one of said members, a rotatable element in screw thread relation with the other of said supporting members, and a pivot carried by said rotatable element.

WILLIAM J. GROTENHUIS.